United States Patent
Herbert et al.

(10) Patent No.: US 7,266,514 B2
(45) Date of Patent: Sep. 4, 2007

(54) METHOD OF PERSONALIZING AN ORNAMENTAL RING IN REAL-TIME

(75) Inventors: James Herbert, Western Springs, IL (US); Joseph Wein, Highland Park, IL (US)

(73) Assignee: Hampden Corporation, Chicago, IL (US)

( * ) Notice: Subject to any disclaimer, the term of this patent is extended or adjusted under 35 U.S.C. 154(b) by 497 days.

(21) Appl. No.: 10/845,435

(22) Filed: May 13, 2004

(65) Prior Publication Data

US 2005/0171866 A1    Aug. 4, 2005

Related U.S. Application Data

(60) Provisional application No. 60/541,856, filed on Feb. 4, 2004.

(51) Int. Cl.
*G06Q 30/00*    (2006.01)
*G06F 17/30*    (2006.01)

(52) U.S. Cl. .................. 705/26; 705/27; 63/26; D11/1; D11/16; D11/26; D11/89

(58) Field of Classification Search ............ 705/1, 705/26–27; 63/26–31, 36; D11/1, 16, 26, D11/89–92
See application file for complete search history.

(56) References Cited

U.S. PATENT DOCUMENTS

| 3,071,940 | A | * | 1/1963 | Schneider | ............. 63/15 |
| 3,483,716 | A | * | 12/1969 | Stenzler | ............. 63/15 |
| 5,806,345 | A | * | 9/1998 | Bonchek | ............. 63/15.1 |
| 6,324,868 | B1 | * | 12/2001 | Chen et al. | ............. 63/1.14 |

FOREIGN PATENT DOCUMENTS

JP    09224723 A    *    9/1997

OTHER PUBLICATIONS www.bluenile.com. Jan. 24, 2002. recovered from www.archive.org on Mar. 4, 2007.*
www.limogesjewelry.com. Jan. 22, 2002. recovered from www.archive.org on Apr. 4, 2007.*
www.motherrings.com. Apr. 5, 2001. recovered from www.archive.org on Mar. 4, 2007.*

(Continued)

*Primary Examiner*—Matthew S. Gart
*Assistant Examiner*—William J. Allen
(74) *Attorney, Agent, or Firm*—McDonnell Boehnen Hulbert & Berghoff LLP

(57) ABSTRACT

A system and method for personalizing an article in real-time is provided. A selection of an article for personalization is accepted from a user. A model of the selected article is displayed. At least one personalization attribute is accepted from the user. The model is modified and displayed, based on the at least one accepted personalization attribute, as the at least one personalization attribute is accepted, thereby enabling the user to personalize the article in real-time. The article may be an article of jewelry, such as a ring, a necklace, or a watch.

1 Claim, 24 Drawing Sheets

OTHER PUBLICATIONS www.motherrings.com. Apr. 3, 2007. Accessed from Internet Explorer on Mar. 4, 2007.* www.bluenile.com. Apr. 3, 2007. recovered from www.archive.org on Mar. 4, 2007.* www.momsjewelrybox.com. Feb. 1, 2003. recovered from www.archive.org on Mar. 4, 2007.* www.ice.com. Oct. 1, 2003. recovered from www.archive.org on Mar. 4, 2007.*

"Online Jewelry Store Offers Customized Mother's Day Gifts". PR Newswire. Apr. 16, 2002. recovered from Dialog database on Sep. 4, 2007.*

"Catalogcity.com Announces Top-Selling Motyher's Day Gifts for 2001". Business and Lifestyle Editors. Business Wire. May 1, 2001. recovered from Proquest database on Mar. 4, 2007.*

"The Mother of all Gifts". St. Petersburg Times. May 9, 2002. recovered from Proquest database on Apr. 4, 2007.*

"Once a Mother, Always a Mother". Jacobson, Susan. Orlando Sentinel. May 11, 2002. recovered from Proquest database on Apr. 4, 2007.* www.wherethediamondsare.com. Mar. 25, 2002. recovered from www.archive.org on Mar. 4, 2007.*

* cited by examiner

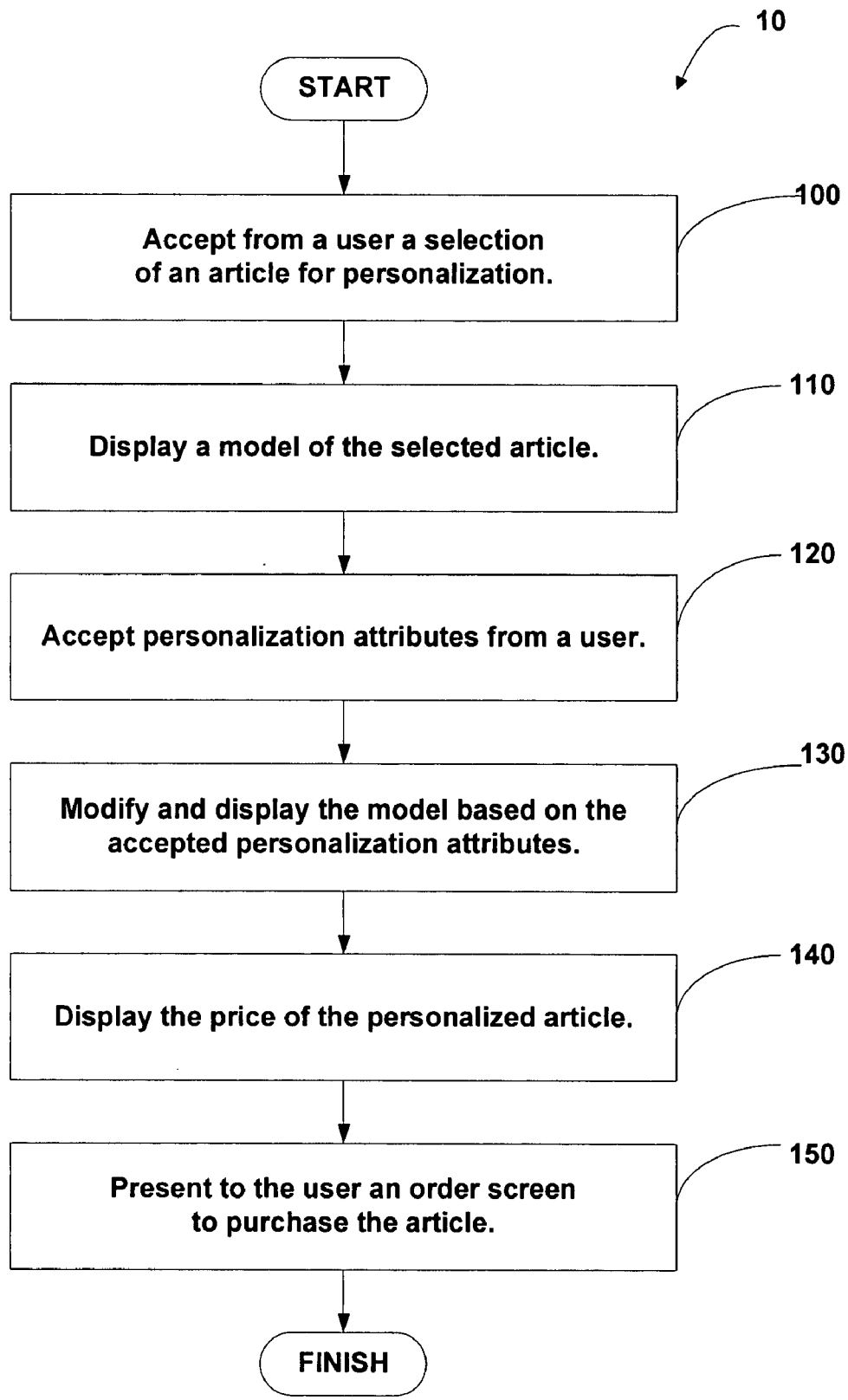

FIG. 2A

| RINGS | BRACLETS | NECKLACES | WATCHES | CUSTOMIZE | CONTACT US |

QUICK LINK AREA

RINGS
BRACLETS
NECKLACES
WATCHES

PRODUCT LINKS

MOTHER'S RINGS
MESSAGE RINGS
NAME RINGS
COUPLE RINGS

RELATED ITEMS

JEWELRY GUIDE
WHATS NEW
EXCLUSIVE DEALS

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING
AVAILABLE IN 10K AND 14K GOLD.
STYLE'S #82038 10K & #83038 14K
STARTING AT $100.00

GOLD MOTHER'S BIRTHSTONE RING

GOLD MOTHER'S BIRTHSTONE RING

GOLD MOTHER'S BIRTHSTONE RING

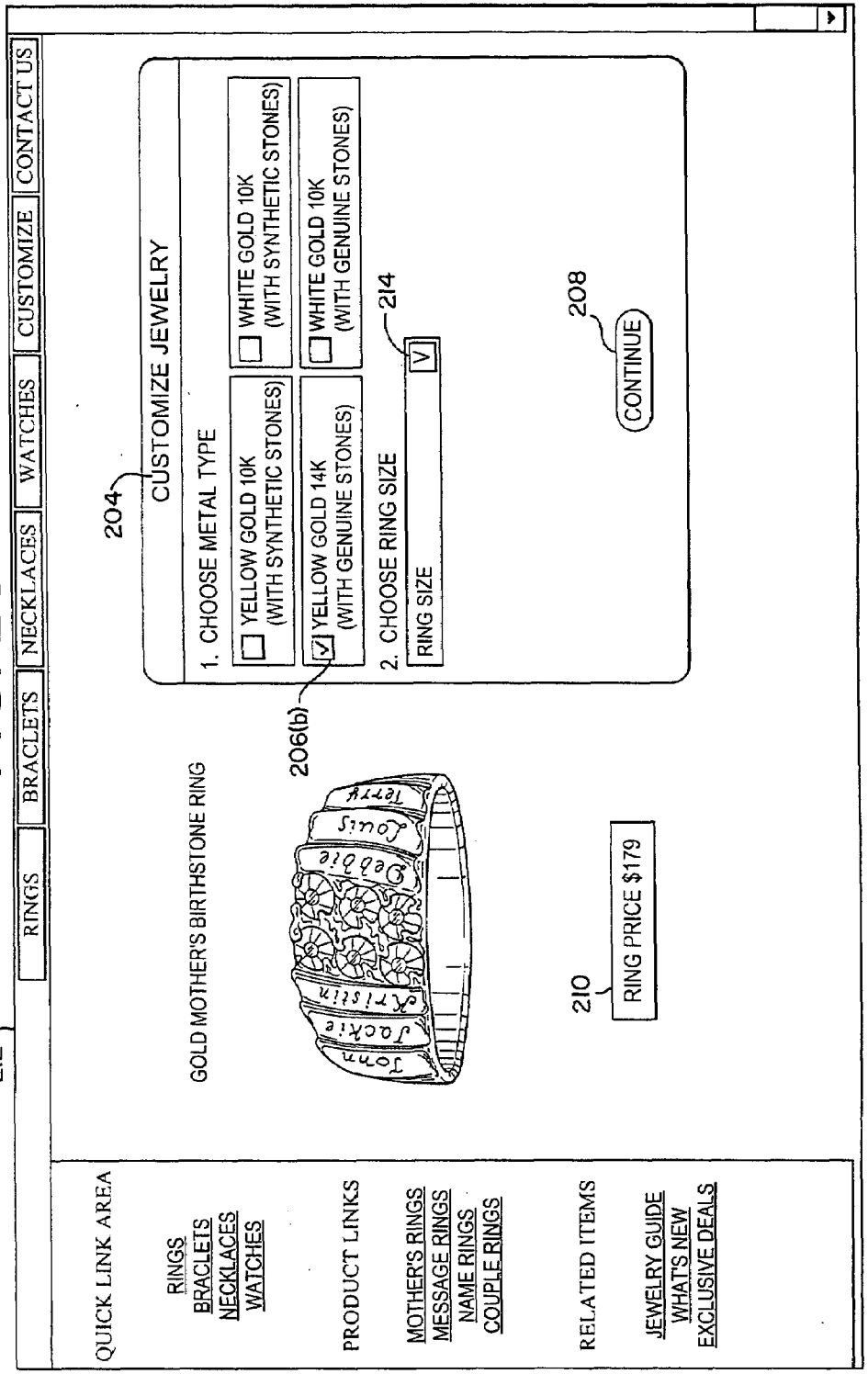

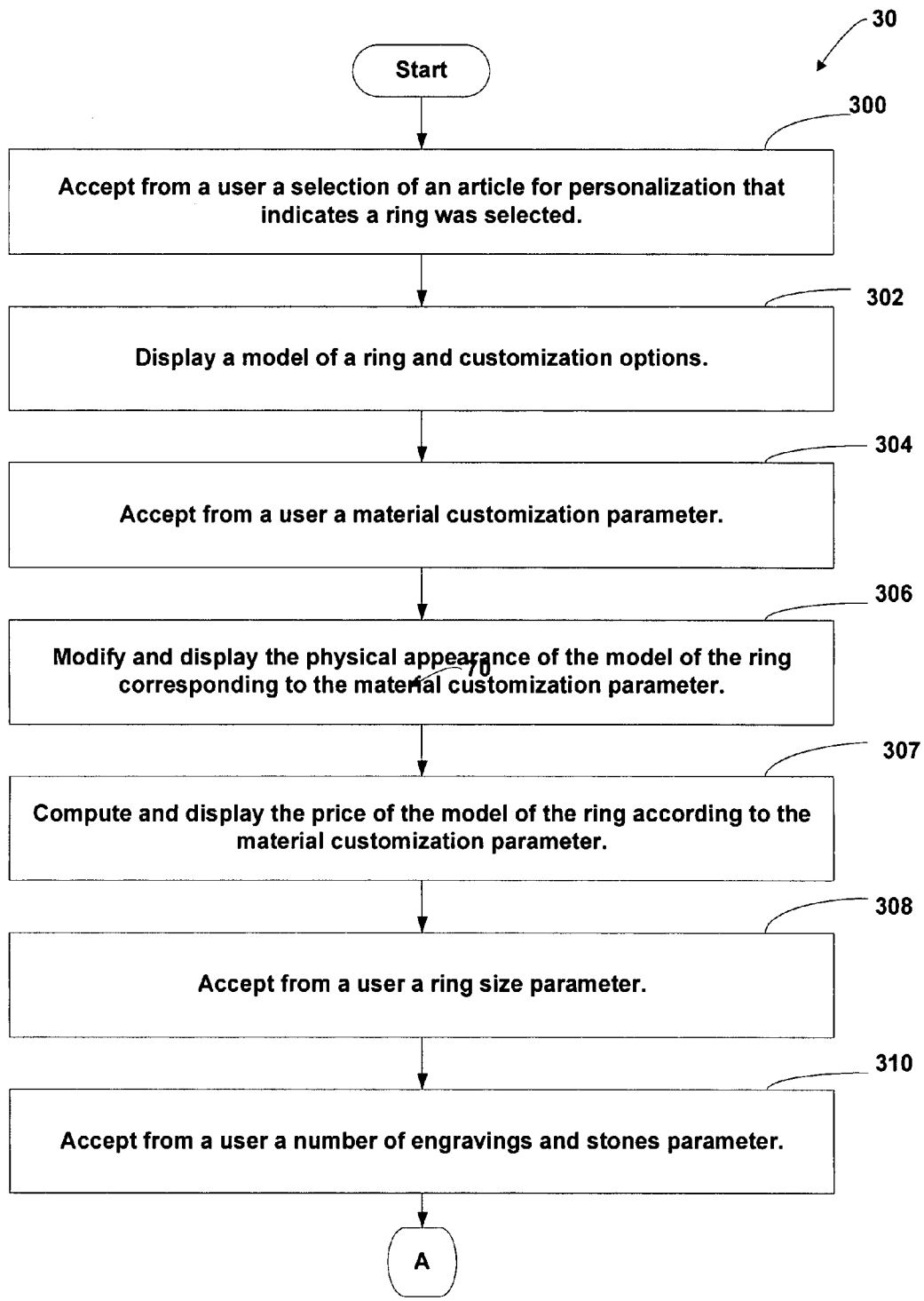

| RINGS | BRACLETS | NECKLACES | WATCHES | CUSTOMIZE | CONTACT US |

SCRIPT NAME NECKLACE

CUSTOMIZE JEWELRY — 404

1. CHOOSE METAL TYPE
   ☑ YELLOW GOLD 10K    ☐ YELLOW GOLD 10K
   406

2. TYPE IN NAME (UP TO 8 CHARACTERS FOR NAME.)
   [_____] 416

(CONTINUE) 410

SCRIPT NAME NECKLACE FEATURES

THIS NECKLACE HAS SWEPT PEOPLE AWAY. IT'S FLOWING BEAUTY AND OUTSTANDING CRAFTSMANSHIP IS UNMATCHED. AN EXCELLENT PRESENT FOR ANY OCCASION.

SOLID 14K GOLD CONSTRUCTION. 18" GOLD ROPE CHAIN.

BUILD YOUR OWN NECKLACE

NECKLACE PRICE $ 99
412

SAMPLE PENDANT

414

QUICK LINK AREA

RINGS
BRACLETS
NECKLACES
WATCHES

PRODUCT LINKS

MOTHER'S RINGS
MESSAGE RINGS
NAME RINGS
COUPLE RINGS

RELATED ITEMS

JEWELRY GUIDE
WHAT'S NEW
EXCLUSIVE DEALS

FIG. 4D

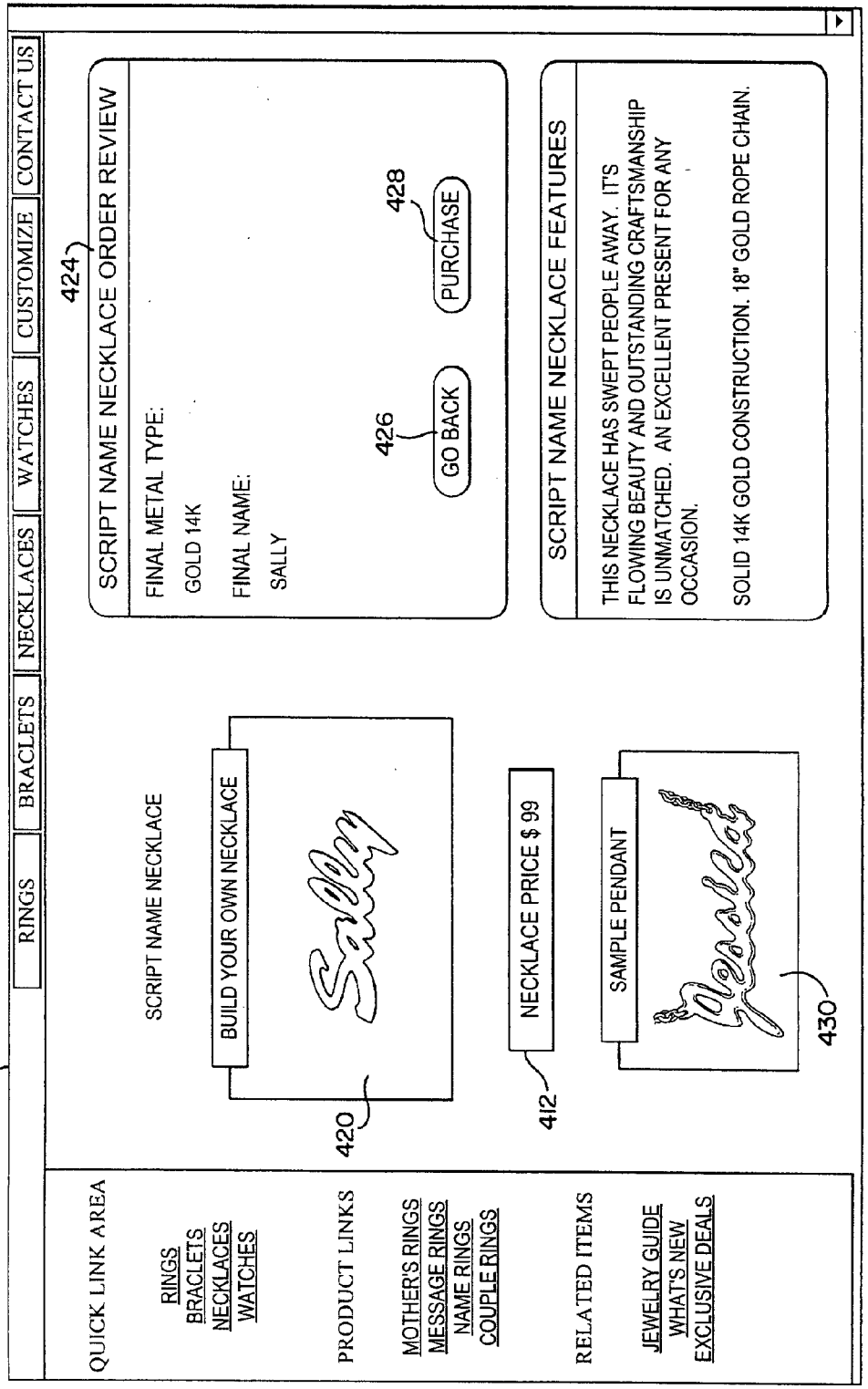

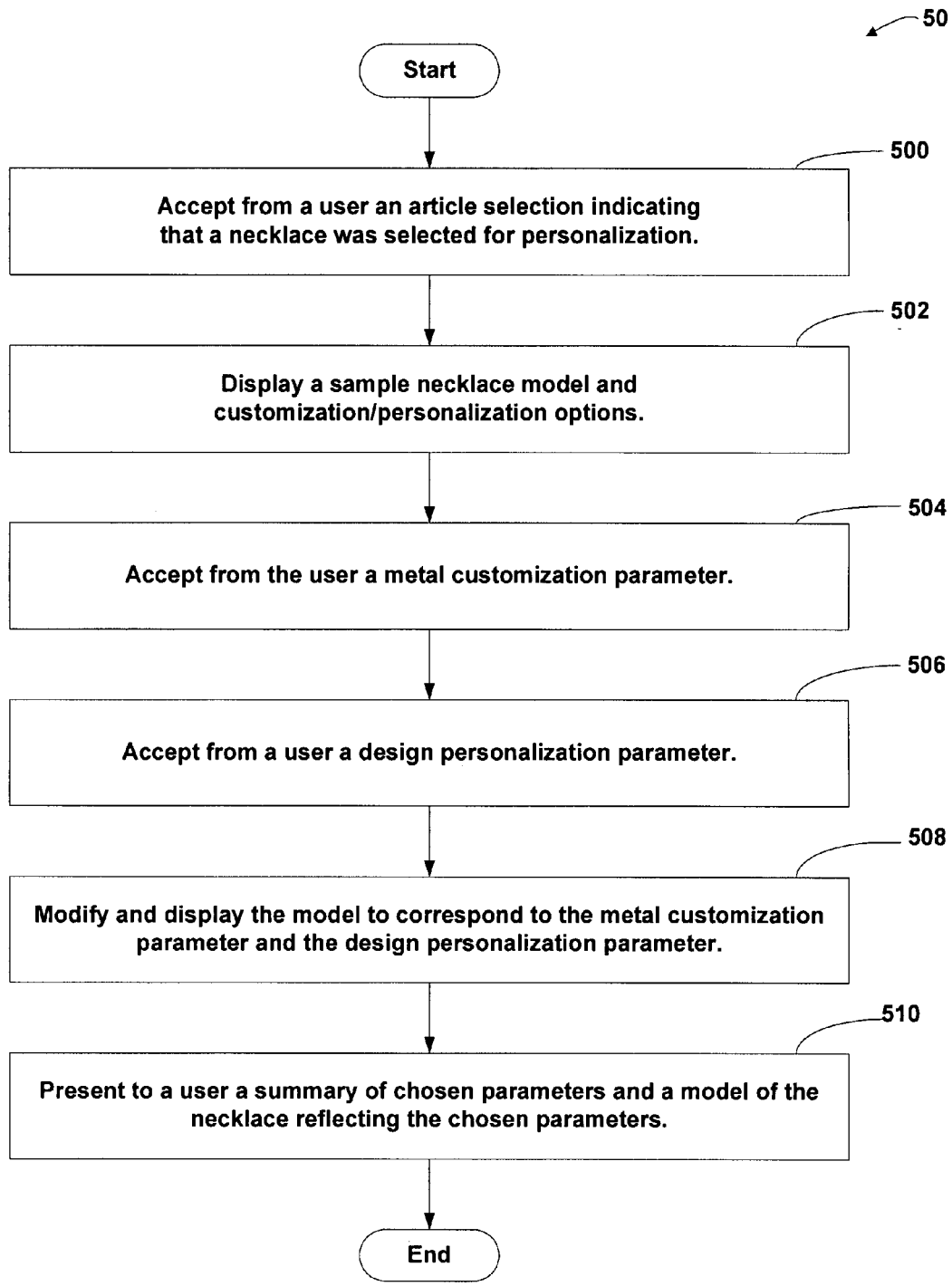

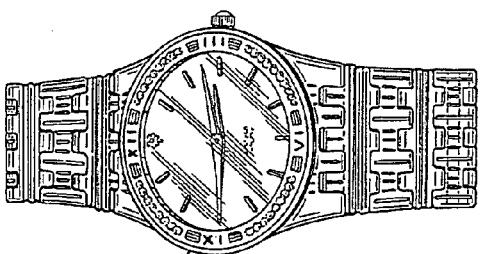

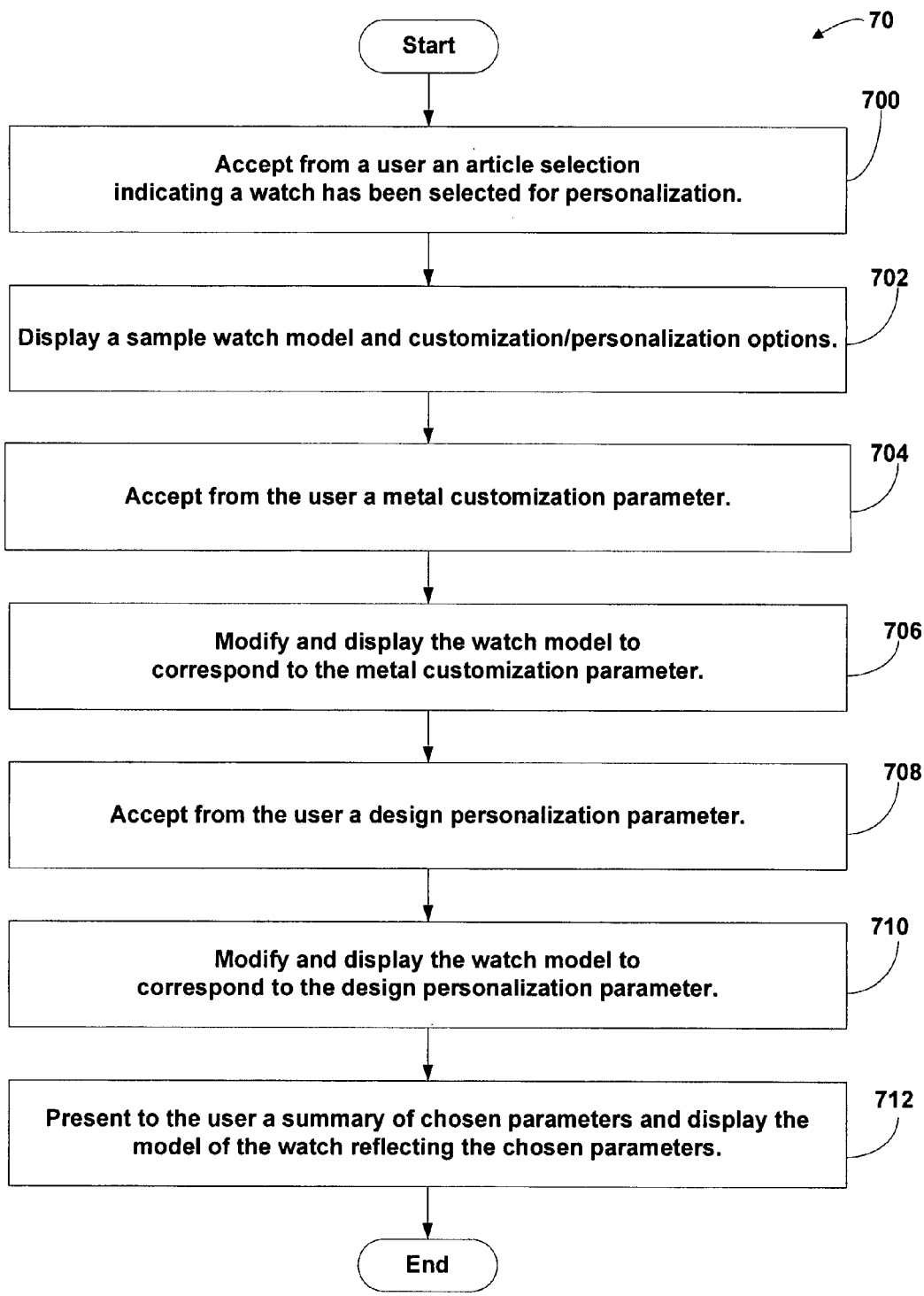

METHOD OF PERSONALIZING AN ORNAMENTAL RING IN REAL-TIME

BACKGROUND

This application claims priority to the U.S. Provisional Ser. No. 60/541,856 filed on Feb. 4, 2004. The present invention relates in general to personalizing articles in real-time, and more particularly, without limitation, to a system and method of personalizing jewelry in real-time.

Jewelry and other luxury and/or ornamental articles are often offered in many materials and configurations. Purchasers of such items frequently wish to have unique pieces and/or pieces that have personal significance. In addition, many purchasers wish to include at least some creative input into an article's design.

Historically, such customization and personalization was attained by visiting an article designer or reviewing actual samples or pictures from a catalog. For example, a potential ring purchaser may have handled dozens of ring blanks, looked at many stone options and settings in a catalog, and picked a ring size. The purchaser would then typically have to wait for several days or weeks to see the completed ring. In many cases, this would be the first time the purchaser would see the selected combination of ring, stone, and setting. If the purchaser was dissatisfied with the finished combination, there would be few options other than scrapping the ring and starting over or going through with purchasing the less-than-perfect ring. The problem is exacerbated when personalization options are presented, such as adding names or logos to a ring or other jewelry.

Adding a personalized name to a name plate, such as on a name necklace, may involve several variables that are not present in other customizations. For example, adding a name could include choosing the name (ordering of letters), font, color (if any), placement technique (e.g. engraving, relief, screenprint, etc.), location, and size. These multiple considerations make it difficult for a prospective purchaser to visualize their personalized name in a stylized font. This lack of information may adversely affect the purchasing process.

Similar problems exist for other articles. For example, a company making a large purchase of corporate glassware may wish to see samples of the finished personalized product prior to making a large purchase. While samples can be printed and sent through the mail, such a process is slow and cumbersome and is likely to allow for viewing of a large number of samples. Expense to the glassware designer is also a concern with such a process.

Thus, it would be desirable to have a system and method for personalizing an article interactively and providing a visualization of the completed item. The system and method should be user-friendly and enable the user to view a sample of the article being personalized to assist in the purchasing and personalization process.

BRIEF DESCRIPTION OF THE DRAWINGS

Preferred embodiments of the present invention are described with reference to the following drawings, wherein:

FIG. 1 is a flow diagram illustrating a method for personalizing an article, in accordance with an exemplary embodiment of the present invention;

FIG. 2A is a graphical representation of a first display that may be used in a system and method for personalizing a ring, in accordance with an exemplary embodiment of the present invention;

FIG. 2C is a graphical representation of a third display that may be used in a system and method for personalizing a ring, in accordance with an exemplary embodiment of the present invention;

FIG. 2F is a graphical representation of a sixth display that may be used in a system and method for personalizing a ring, in accordance with an exemplary embodiment of the present invention;

FIG. 2H is a graphical representation of an eighth display that may be used in a system and method for personalizing a ring, in accordance with an exemplary embodiment of the present invention;

FIG. 3A-B is a flow diagram illustrating a method for personalizing a ring, in accordance with an exemplary embodiment of the present invention;

FIG. 4A is a graphical representation of a first display that may be used in a system and method for personalizing a necklace, in accordance with an exemplary embodiment of the present invention;

FIG. 4C is a graphical representation of a third display that may be used in a system and method for personalizing a necklace, in accordance with an exemplary embodiment of the present invention;

FIG. 4D is a graphical representation of a fourth display that may be used in a system and method for personalizing a necklace, in accordance with an exemplary embodiment of the present invention;

FIG. 4E is a graphical representation of a fifth display that may be used in a system and method for personalizing a necklace, in accordance with an exemplary embodiment of the present invention;

FIG. 5 is a flow diagram illustrating a method for personalizing a necklace, in accordance with an exemplary embodiment of the present invention;

FIG. 6D is a graphical representation of a fourth display that may be used in a system and method for personalizing a watch, in accordance with an exemplary embodiment of the present invention;

FIG. 7 is a flow diagram illustrating a method for personalizing a watch, in accordance with an exemplary embodiment of the present invention.

DETAILED DESCRIPTION

In view of the wide variety of embodiments to which the principles of the present invention can be applied, it should be understood that the illustrated embodiments are exemplary only, and should not be taken as limiting the scope of the present invention.

Figure 8:
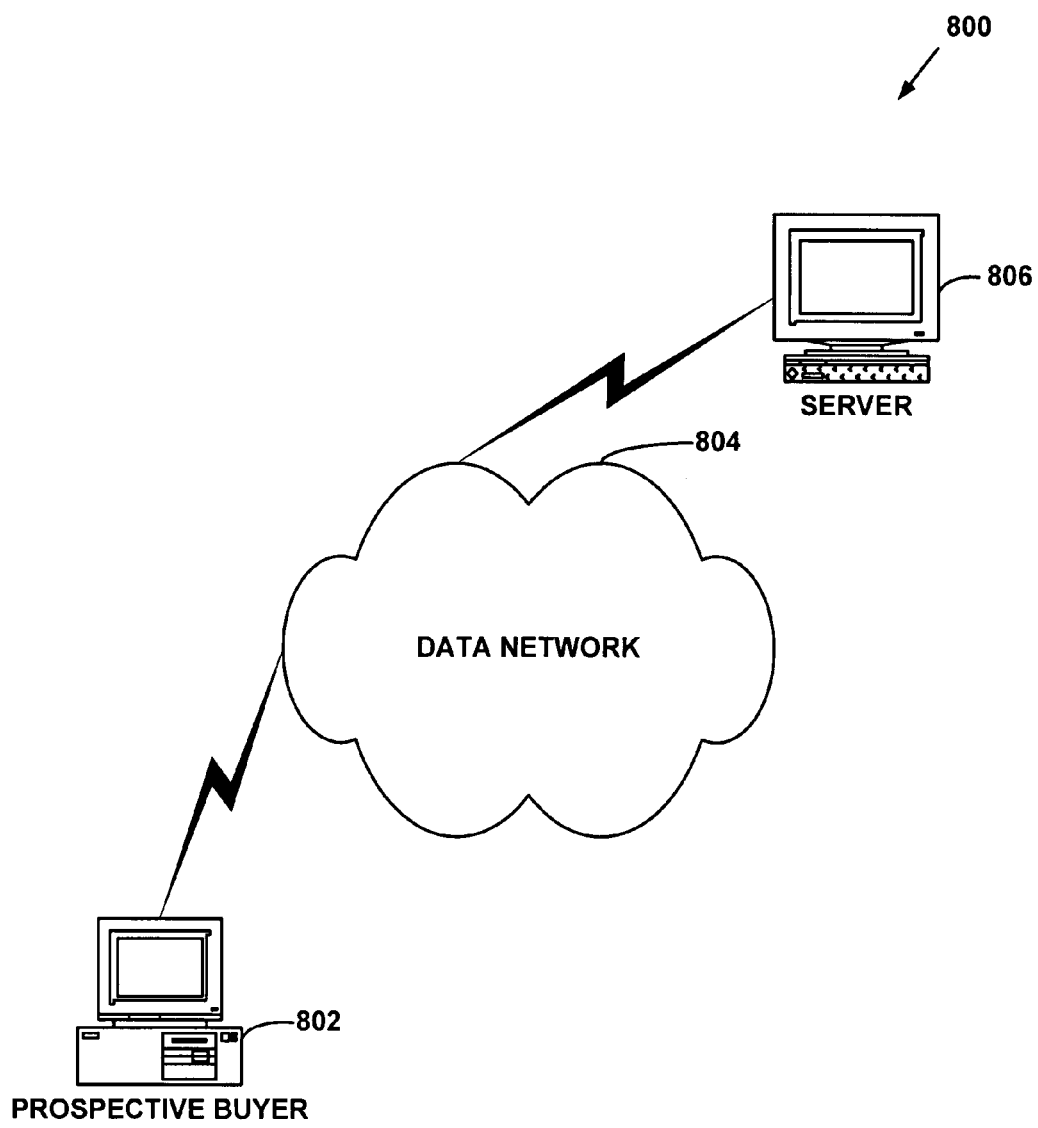
FIG. 8 is a simplified block diagram illustrating a system for personalizing an article, in accordance with an exemplary embodiment of the present invention.

FIGS. 1 and 8 and their accompanying descriptions pertain to a system and method of personalizing an article in a general sense, while FIGS. 2A-3B, 4A-5, and 6A-7 are directed to systems and methods for personalizing rings, necklaces, and watches, respectively. Detailed examples are provided for rings, necklaces, and watches; however, many of the disclosed concepts could be applied to other jewelry types, such as bracelets, earrings, and pendants, as well as other personalizable non-jewelry articles, such as glassware.

Personalizing an Article in General

FIG. 1 is a flow diagram illustrating a method 10 for personalizing an article, in accordance with an exemplary embodiment of the present invention. The method 10 is preferably implemented as a client-server based system, and may be implemented on a Wide Area Network (WAN), such as the World-Wide-Web supported by the public Internet.

The method 10 includes accepting an article selection from a user, as shown in block 100. The article selection could be made, for example, by accepting a user input through a graphical user interface displayed to the user. A model corresponding to the article selected for personalization is displayed to the user, as shown in block 110. The model may be "blank" or free from any markings, or it may show a sample personalization characteristic, such as a sample name or logo engraved on the article. Upon presenting the user with one or more personalization options, the method 10 includes accepting one or more personalization attributes from the user, as shown in block 120, and modifying and displaying the model to correspond to the accepted personalization attributes, as shown in block 130. The price of the article as personalized is displayed (block 140), and the user may be presented with ordering options (block 150). The price may be determined by referencing a look-up table stored in a memory, or by performing a computation based on the selected article and accepted personalization attributes. Other pricing techniques may also be used.

The method 10 differs from other customization techniques because it allows for personalization, in addition to mere customization. For example, while selecting a color from among a plurality of choices could allow a user to "customize" an article, accepting a personalization attribute, such as a name or logo, from the user enables the user to actually "personalize" the article to be at least relatively unique to that user. By displaying a representation of the personalized article (which may have been re-sized or re-shaped based on the accepted personalization attribute) to the user, the method 10 provides the user with better information to assist the user in making a purchasing decision. This may, in turn, lead to increased sales to the entity offering the articles for sale.

Personalizing a Ring

FIG. 2A is a graphical representation of a first display 200 that may be used in a system and method for personalizing a ring, in accordance with an exemplary embodiment of the present invention. The display 200 may be presented to the user initially, such as when the user accesses a web-site offering the rings for personalization, or the display 200 may be shown subsequent to previous selection displays. For example, a home page for a website may allow the user to select from among several articles, such as rings, bracelets, necklaces, and watches for example. Article selection may be made using textual or graphical means; however, a graphical presentation is preferred. Alternatively, audio and/or video presentation techniques may used. In the example of FIG. 2A, the nine rings shown are identical—an actual display in commerce would likely picture a plurality of distinct rings.

Figure 2B:
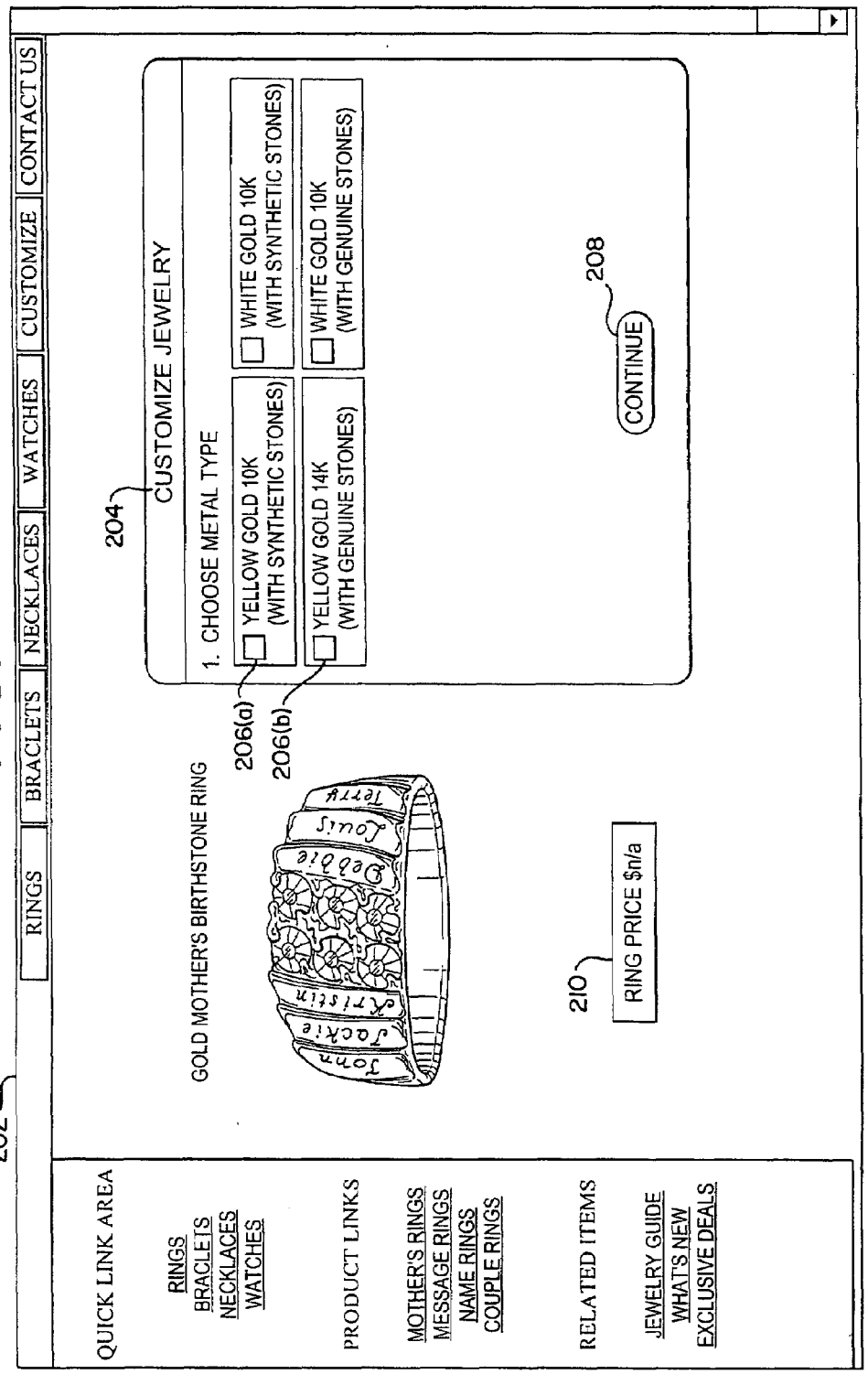
FIG. 2B is a graphical representation of a second display that may be used in a system and method for personalizing a ring, in accordance with an exemplary embodiment of the present invention.

FIG. 2B is a graphical representation of a second display 202 that may be used in a system and method for personalizing a ring, in accordance with an exemplary embodiment of the present invention. The display 202 is an example of a screen that may be displayed after a user selected the "Gold Mother's Birthstone Ring" from the display 200. In addition to displaying a sample model of a finished ring, the display 202 also shows a user interface portion 204 with a plurality of customization and/or personalization options, such as options 206(a) and 206(b) corresponding to yellow 10K gold with synthetic stones or 14K gold with genuine stones, respectively. The interface portion also includes a continue button 208, which accepts the user's customization attribute or personalization attribute before proceeding to a subsequent screen. A ring price field 210 may also be included to provide the user with an indication of the ring's price as customization and/or personalization progresses.

FIG. 2C is a graphical representation of a third display 212 that may be used in a system and method for personalizing a ring, in accordance with an exemplary embodiment of the present invention. The display 212 shows that the user has checked a box to select a material customization parameter. In this case, the user has checked the box 206(b) corresponding to 14K gold with genuine stones. Upon accepting this selection, the display may be updated to change the appearance of the model ring, which may include re-rendering the color or stones, for example. Alternatively, image files stored in a memory may be displayed as the user makes customization and/or personalization changes. Another update that may be made to the display 212 is the price of the modified ring, which may be displayed in the ring price field 210. In the example of FIG. 2C, the price corresponding to the user's selection of 14K gold with genuine stones is $179.

Upon accepting the material customization parameter from the user, the user may be presented with one or more additional personalization or customization attribute options. In the example of FIG. 2C, the user is presented with a ring size parameter option, in the form of a pull-down menu 214.

Figure 2D:
FIG. 2D is a graphical representation of a fourth display that may be used in a system and method for personalizing a ring, in accordance with an exemplary embodiment of the present invention.

FIG. 2D is a graphical representation of a fourth display 216 that may be used in a system and method for personalizing a ring, in accordance with an exemplary embodiment of the present invention. The display 216 illustrates that the user has selected a ring size parameter of 5. In addition, the user is presented with an option for an engravings and stone quantity parameter via another pull-down menu 218.

Figure 2E:
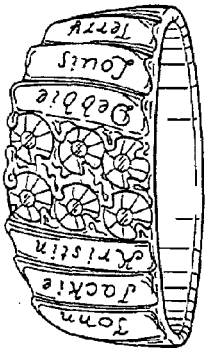
FIG. 2E is a graphical representation of a fifth display that may be used in a system and method for personalizing a ring, in accordance with an exemplary embodiment of the present invention.

FIG. 2E is a graphical representation of a fifth display 220 that may be used in a system and method for personalizing a ring, in accordance with an exemplary embodiment of the present invention. The display 220 shows that the user has selected six engravings and stones from the engravings and stone quantity pull-down menu 218. The continue button 208 may then be pressed to allow the customization and/or personalization attributes to be accepted.

Figure 2F:
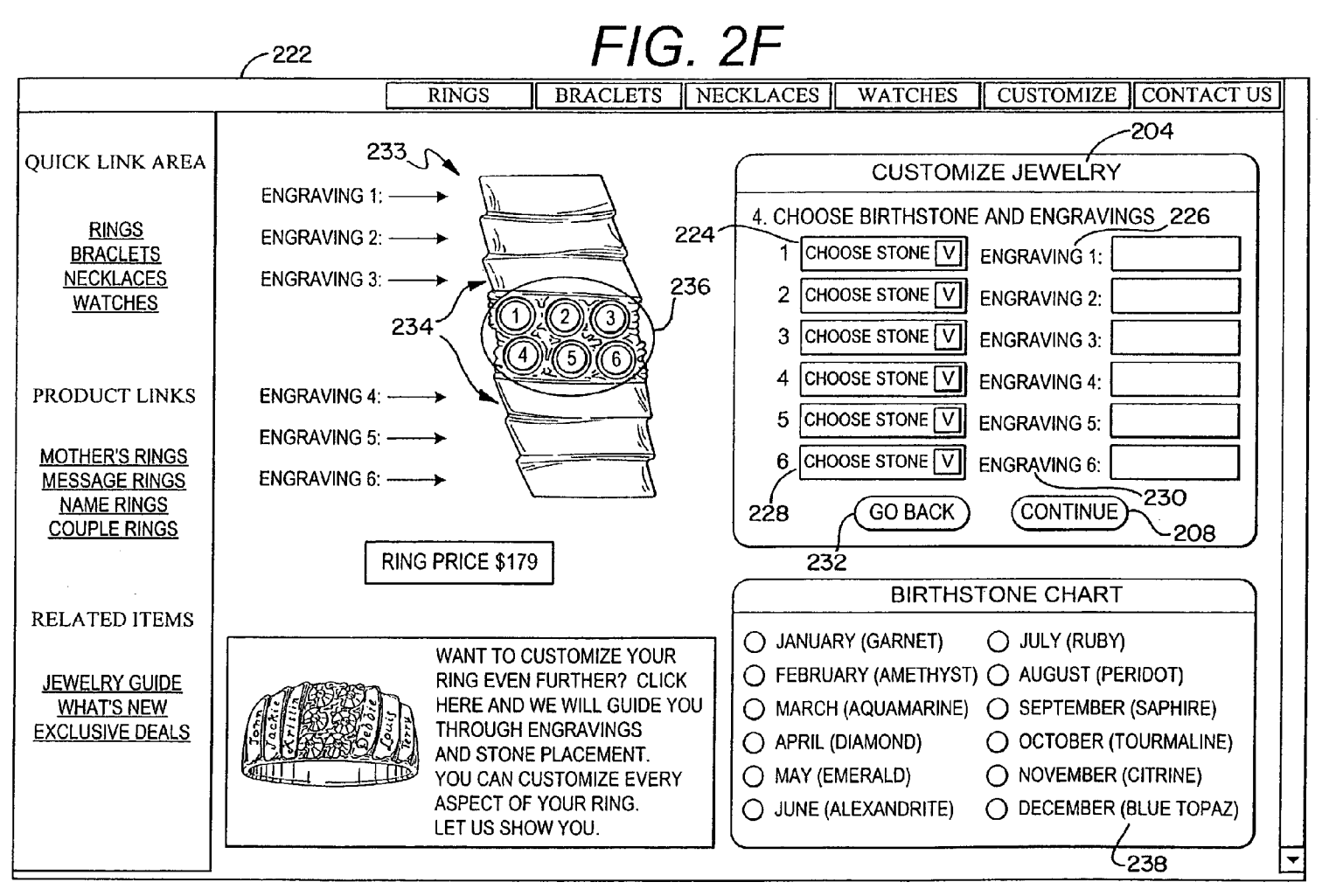

FIG. 2F is a graphical representation of a sixth display 222 that may be used in a system and method for personalizing a ring, in accordance with an exemplary embodiment of the present invention. While displays 200, 202, 212, 216, and 220 primarily illustrated customization attributes rather than personalization attributes, display 222 is directed largely toward personalization attributes that are specific to the particular user. For example, the Mother's Day ring being customized in FIGS. 2A-2H is designed to allow the names of one or more children to be placed on the ring, along with their respective birthstones.

To provide this personalization functionality, the display 222 includes a personalization portion 204 that accepts one or more user inputs corresponding to birthstones 224 and/or engravings 226. Since the user selected six engravings and stones (see FIG. 2E), the personalization portion 204 includes six pull-down menus (e.g. 224 and 228) to accept birthstone inputs and six text-entry fields (e.g. 226 and 230) to accept engraving inputs. To assist the user in selecting birthstones corresponding to particular birth months, a birthstone chart 238 may be included as part of the display 222. If the user needs to modify the number of birthstones and/or engravings, the user can activate the "Go Back" button 232 to return to a display similar to or identical to the display 220.

A particularly beneficial feature that may be provided according to the presently described embodiment is real-time modeling of the ring as it is being personalized. In the display 222, a ring model 233 is displayed just to the left of the personalization portion 204. The model 233 differs from the ring models shown on the previous displays 200, 202, 212, 216, and 220 in that model 233 is configured to allow easier viewing of personalizable features, while the models of displays 200, 202, 212, 216, and 220 simply showed sample completed rings. This may be accomplished by displaying the full flattened shank 234, or at least a personalizable portion, of the ring. For example, when the user enters one or more names into the engraving text-entry fields (e.g. 226 and 230), realistic representations of the engraved names will be shown on the shank 234 of the model 233. Similarly, as the user selects birthstones, they may be displayed in the plurality of settings 236. Moreover, while the example of FIGS. 2A-2H provides the user with engraving as an option, additional customization options may alternatively be used, such as text placement using embossing (relief), screen-printing, or other scripting techniques. Upon accepting personalization attributes (birthstone and/or engraving inputs) from the user, the ring price may be updated, if appropriate. The user may then activate the "Continue" button 208 to proceed with personalizing the ring.

Figure 2G:
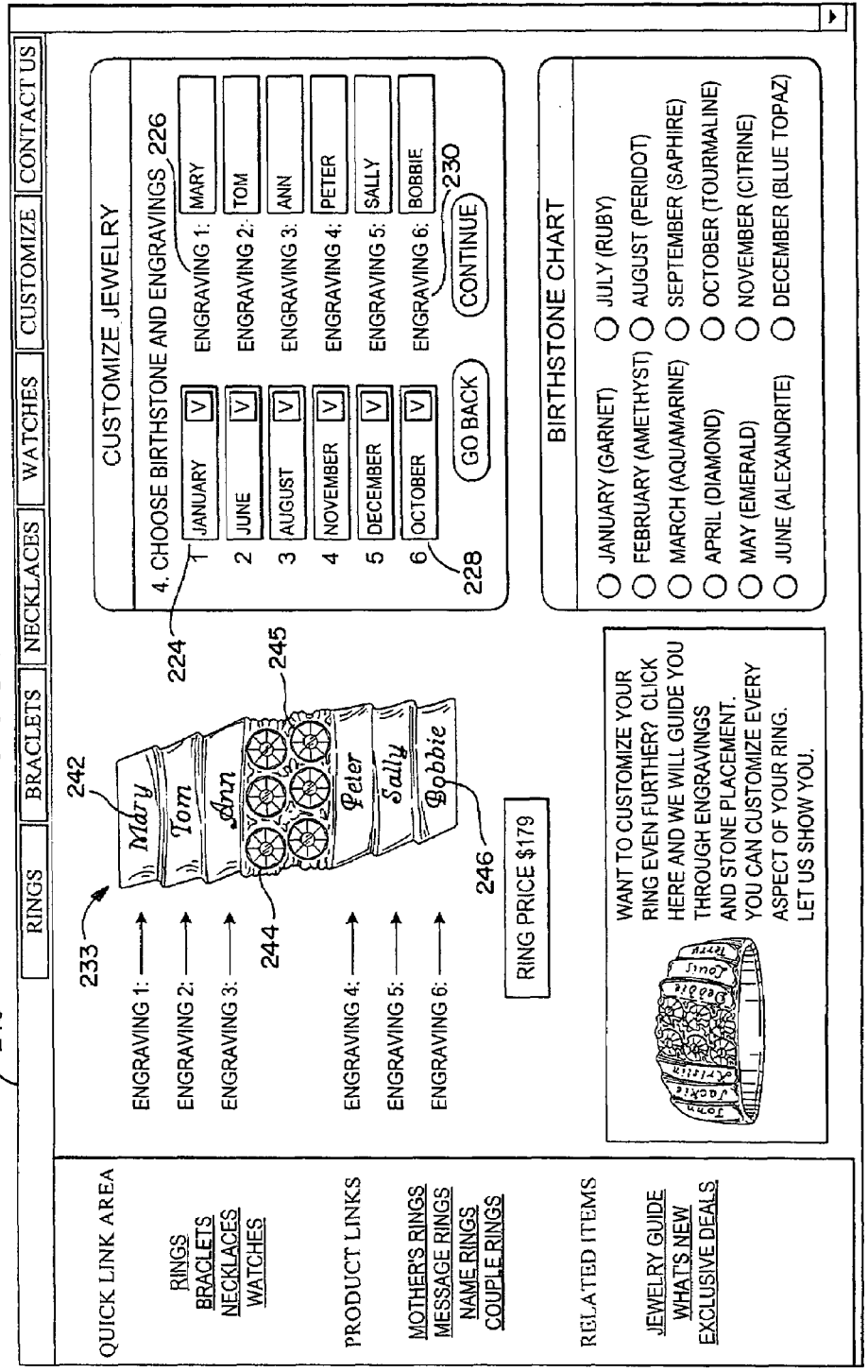
FIG. 2G is a graphical representation of a seventh display that may be used in a system and method for personalizing a ring, in accordance with an exemplary embodiment of the present invention.

FIG. 2G is a graphical representation of a seventh display 240 that may be used in a system and method for personalizing a ring, in accordance with an exemplary embodiment of the present invention. The display 240 shows that the user has selected birthstones corresponding to the following months: January (Garnet), June (Alexandrite), August (Peridot), November (Citrine), December (Blue Topaz), and October (Tourmaline), and has entered the following names to be engraved: Mary, Tom, Ann, Peter, Sally, and Bobbie. The model 233 illustrates a garnet birthstone corresponding to a first birthstone input 224 placed in a first setting 244 on the model 233. A tourmaline birthstone is shown in a sixth setting 245 corresponding to a sixth birthstone input 228. Similarly, birthstones corresponding to other accepted birthstone inputs are shown in respective corresponding settings on the model 233. The engraving inputs 226 and 230 are shown on shank portions 242 and 246 respectively, and all other engraving inputs are also shown on corresponding shank portions. Since the model 233 is preferably updated in real-time, the user may wish to change placement of engravings or birthstones by modifying the order of birthstone and/or engraving inputs. Additionally, in the example of FIG. 2G, while the engravings on the shank portions of the model 233 are all displayed right-side-up, in an alternative embodiment, the upper shanks (above the birthstones in the model 233) may display the text upside-down. While this may more closely correspond to an actual personalized ring, it may be more difficult for the user to conceptualize the appearance of the finished ring.

Figure 2H:
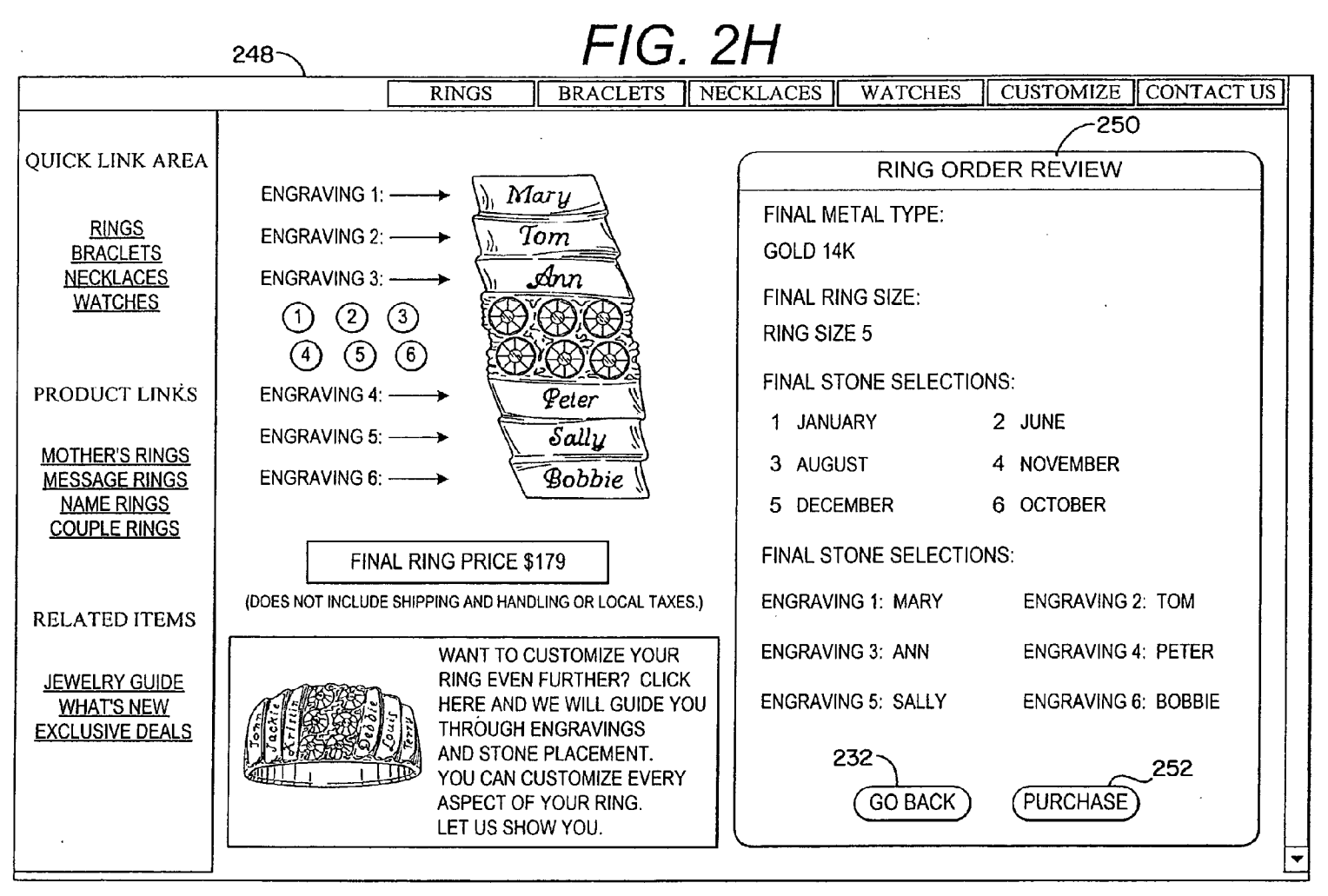

FIG. 2H is a graphical representation of an eighth display 248 that may be used in a system and method for personalizing a ring, in accordance with an exemplary embodiment of the present invention. The display 248 includes a ring order review portion 250 that summarizes the accepted personalization attributes, as well as a "Go Back" button 232 that may be activated by the user to modify one or more personalization attributes. Finally, a "Purchase" button 252 may be included to initiate a purchase routine, such as a "shopping cart" or "one-click" process, for example.

Figure 3B:
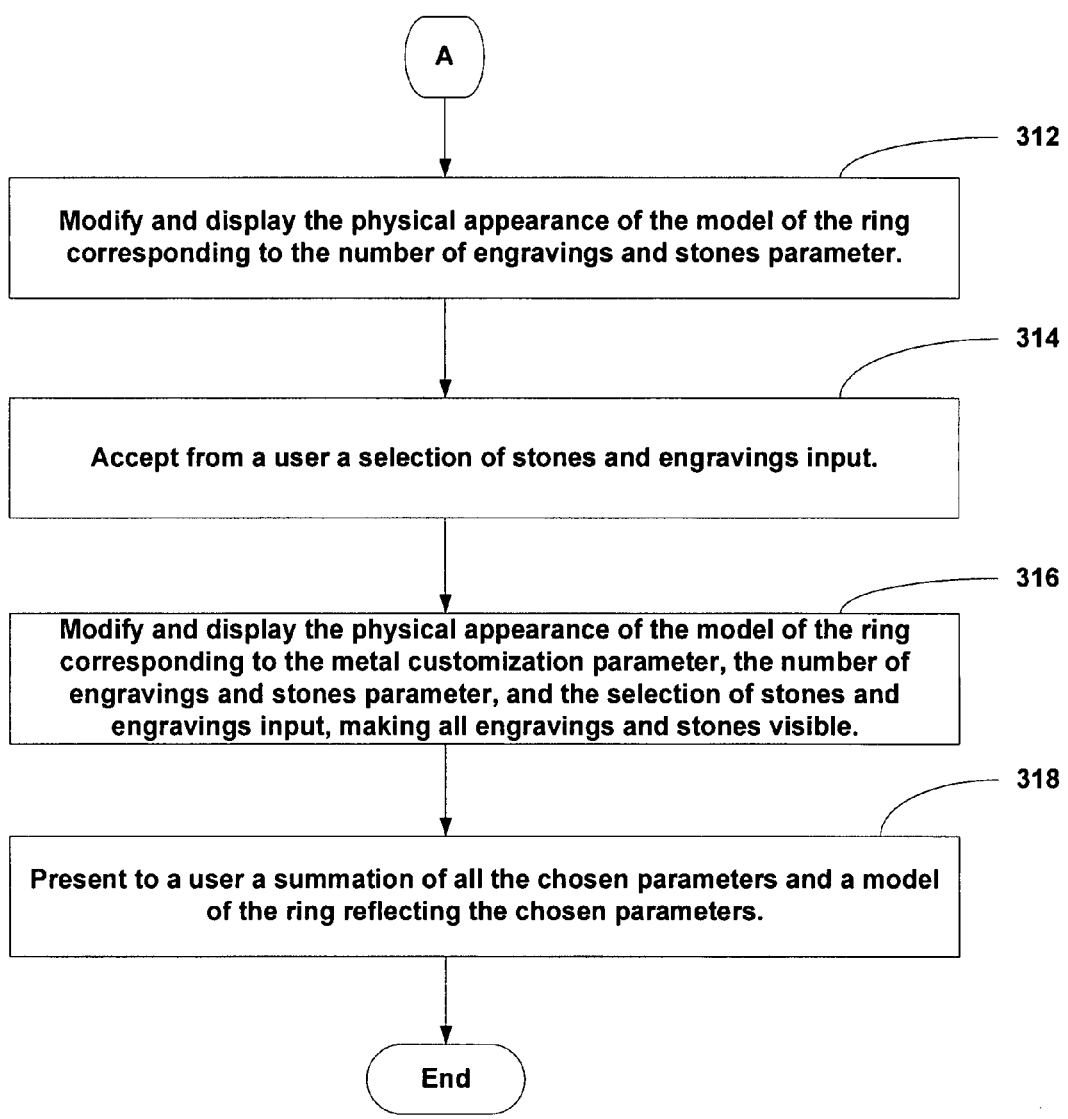

FIG. 3A-B is a flow diagram illustrating a method 30 for personalizing a ring, in accordance with an exemplary embodiment of the present invention. The method 30 includes accepting from a user a selection of an article for personalization, as shown in block 300. In the example of method 30, the selected article is a personalizable ring. In block 302, a sample model of the ring is displayed and customization and/or personalization options are provided. In block 304, a metal customization parameter is accepted from the user. The metal customization parameter may instead be a "material customization parameter" if a material other than metal may be used to fabricate all or part of the ring. In block 306, the model's physical appearance is modified to correspond to the accepted metal customization parameter. In block 307, an updated price (based on the particular customization and/or personalization parameters) is determined and displayed. The determination may be made by a simple computation or by reference to a lookup table stored in memory. In block 308, a ring size parameter is accepted from the user. In block 310, one or more engravings and/or stones quantity parameter is accepted from the user. In block 312, the ring model is modified to correspond to the accepted engravings and/or stones quantity parameter. In block 314, a selection of stones and engravings input is accepted from the user, such as through the pull-down menus and/or text-entry fields of FIG. 2F. In block 316, the ring model is modified to correspond to the accepted selection of stones and engravings input. In block 318, the user is presented with a personalization summary and model of the personalized ring. Purchasing options may also be presented.

The method 30 is merely exemplary, and numerous modifications may be made without departing from the intended scope of the present invention. For example, while the method 30 offered engraving as a scripting method, other techniques may also be used. Furthermore, while the user was presented with a plurality of stones for customization/personalization, other objects, such as charms, graphics, etc, may alternatively be presented as options to the user. Lastly, while the method 30 was described as a sequence of blocks, different orderings may be utilized, and additional or fewer blocks may be included in the method 30, depending on the intended application.

Personalizing a Necklace

The following example is similar to the previous example, in that jewelry is being personalized. The particular necklace being personalized has a personalization-dependent shape.

Figure 4A:
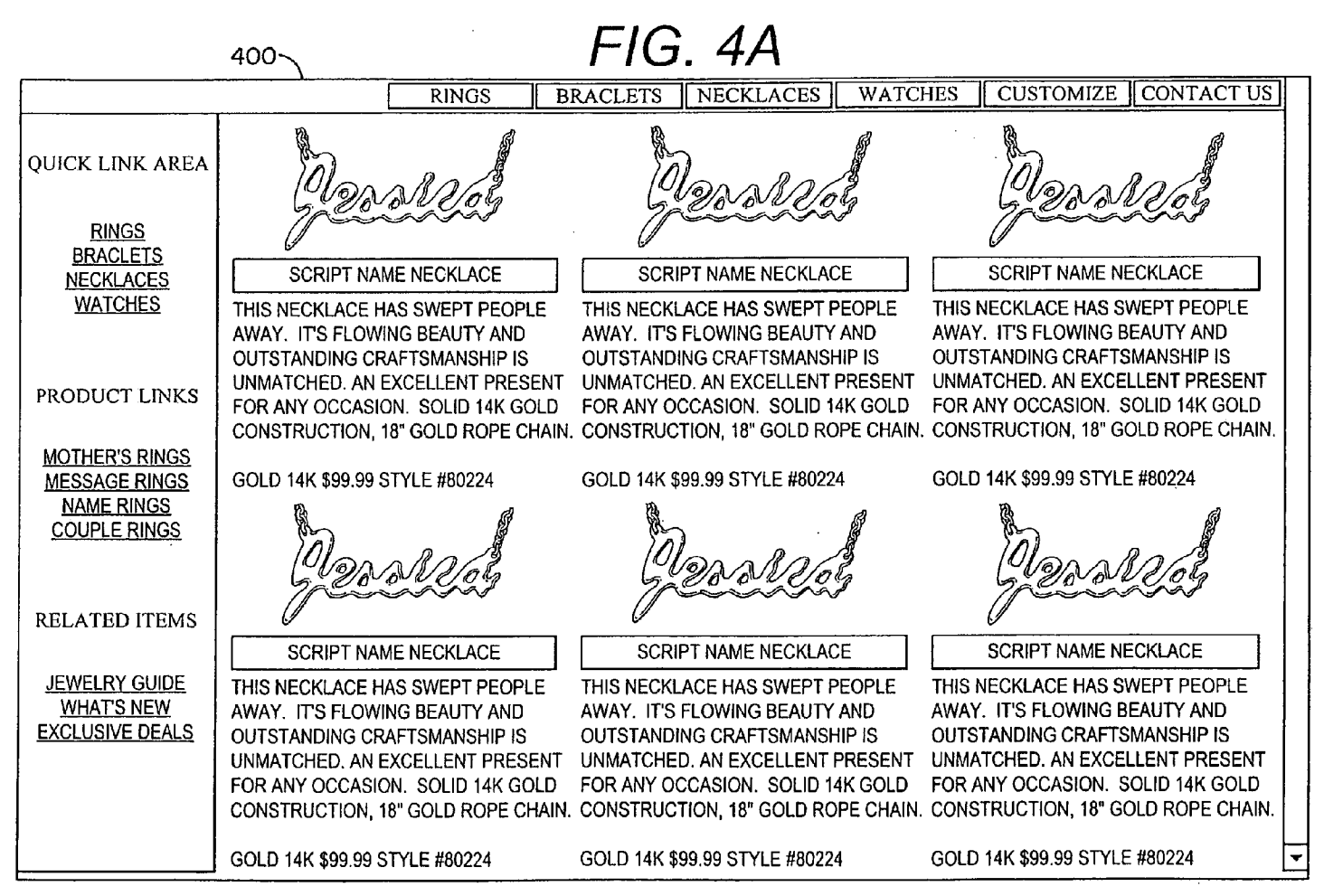

FIG. 4A is a graphical representation of a first display 400 that may be used in a system and method for personalizing a necklace, in accordance with an exemplary embodiment of the present invention. The display 400 presents the user with a plurality of article selections, which in this case are directed to a script necklace. Note that an actual implementation of display 400 would likely show variations of the necklace, rather than a plurality of identical script necklaces.

Figure 4B:
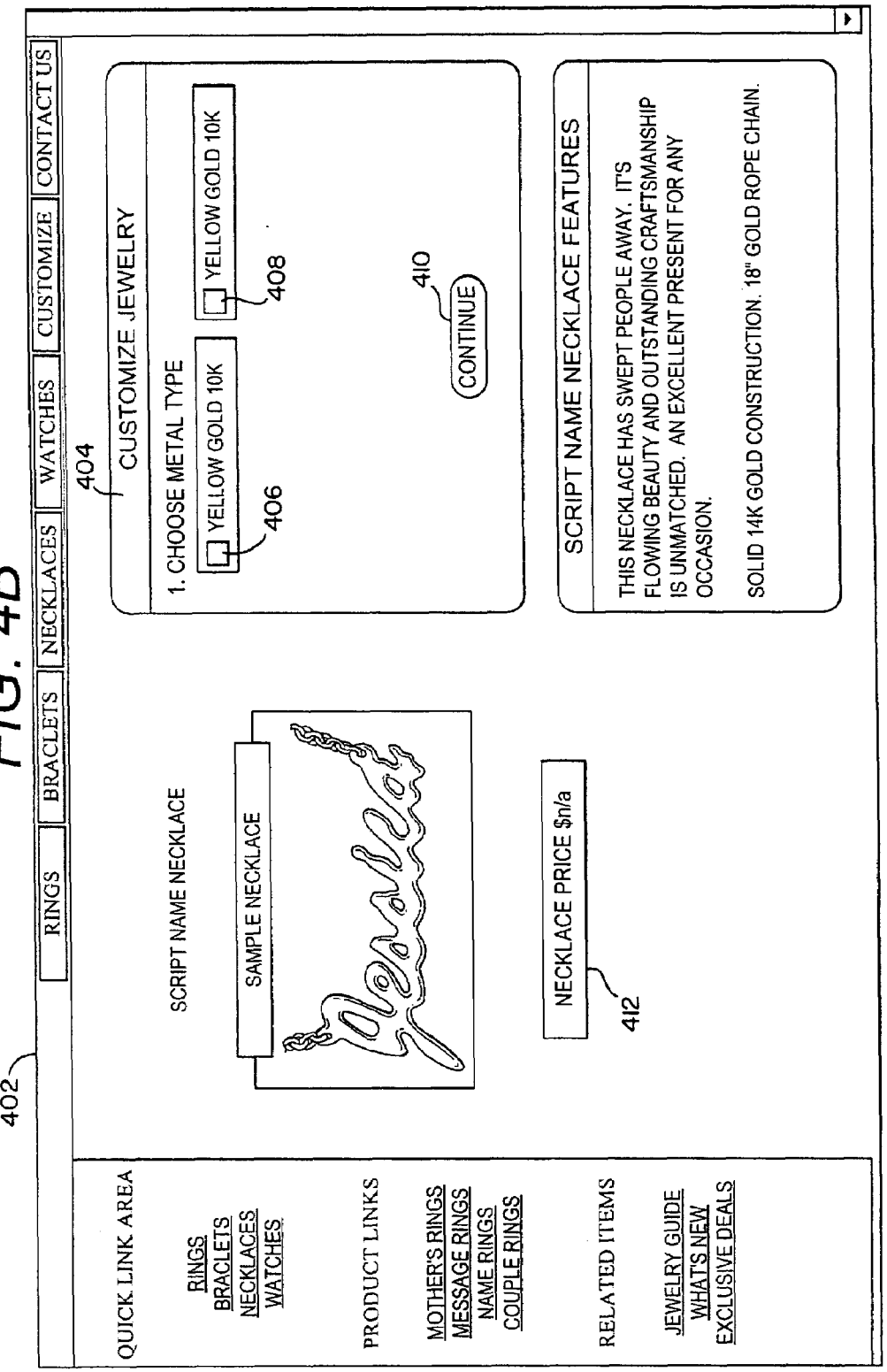
FIG. 4B is a graphical representation of a second display that may be used in a system and method for personalizing a necklace, in accordance with an exemplary embodiment of the present invention.

FIG. 4B is a graphical representation of a second display 402 that may be used in a system and method for personalizing a necklace, in accordance with an exemplary embodiment of the present invention. The display 402 would be shown to the user after the user selects a script name necklace from the display 400. The display 402 includes a portion 404 that allows the user to select yellow gold 14k via a first checkbox 406 or white gold via a second checkbox 408. A sample necklace model is displayed to the left of the portion 404. The display 402 also includes a price field 412 and a continue button 410.

FIG. 4C is a graphical representation of a third display 414 that may be used in a system and method for personalizing a necklace, in accordance with an exemplary embodiment of the present invention. In display 414, the user has selected yellow gold 14K by clicking the first checkbox 406. This selection causes a name text-entry field 416 to be displayed to enable the user to enter a personalized name. The selection also causes the price field 412 to be updated to reflect the selected material.

Figure 4D:
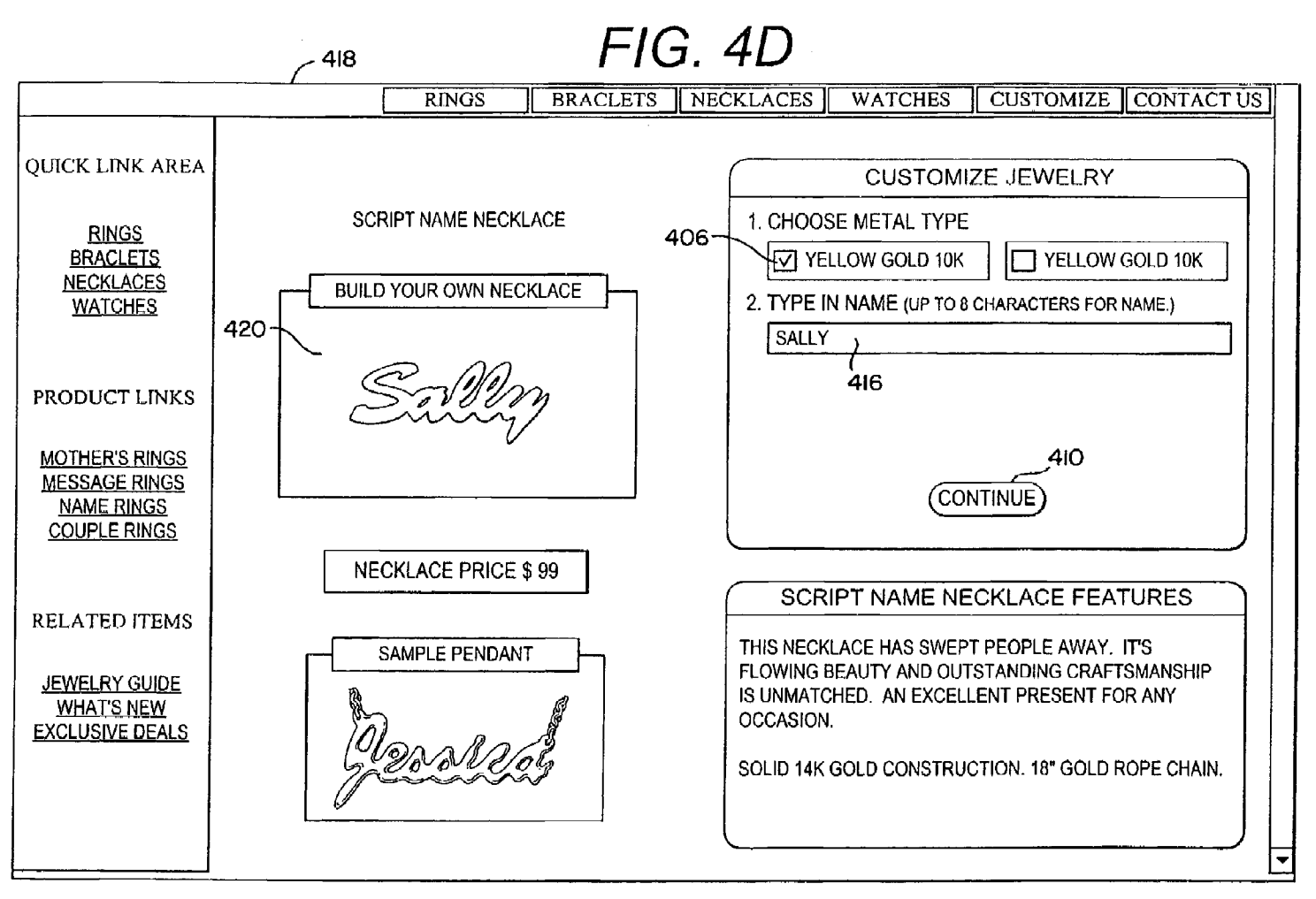

FIG. 4D is a graphical representation of a fourth display 418 that may be used in a system and method for personalizing a necklace, in accordance with an exemplary embodiment of the present invention. The display 418 illustrates a model 420 that is shown to the user as the user enters the name "Sally" into the name text-entry field 416. By activating the button 410, the user proceeds further in the personalization process.

FIG. 4E is a graphical representation of a fifth display 422 that may be used in a system and method for personalizing a necklace, in accordance with an exemplary embodiment of the present invention. The display 422 shows a personalization summary similar to that shown in display 248 in FIG. 2H. The display 422 also shows a sample pendant display 430, which shows the user how a completed necklace-and-chain combination would look. As was the case with the display 248, the user is presented with a first button 426 for changing selections and a second button 428 for initiating a purchase.

FIG. 5 is a flow diagram illustrating a method 50 for personalizing a necklace, in accordance with an exemplary embodiment of the present invention. The method 50 includes accepting an article selection from a user, as shown in block 500. In this case, the user has selected a necklace for personalization. In block 502, a sample model (unpersonalized) of the necklace is displayed and the user is presented with customization and/or personalization options. In block 504, a metal customization parameter is accepted from the user. Depending on available materials, the metal customization parameter may instead be a "material customization parameter." In block 506, a design personalization parameter is accepted from the user. For the example illustrated in FIGS. 4A-4E, the necklace was a script necklace, so the design personalization parameter was a name attribute. The particular name attribute entered by the user changed the shape, and thus, the design, of the necklace. In block 508, the model is modified to correspond to the customization and personalization parameters entered by the user. The modified sample is displayed to the user for the user's convenience in making personalization and purchasing decisions. In block 510, the user is presented with a summary of selected personalization and/or customization parameters, a model reflecting those parameters, and possibly pricing and purchasing information. The method 50 is merely exemplary, and more or fewer steps may be included, and the described steps may be performed in a sequence other than that set forth in FIG. 5.

Personalizing a Watch

Figure 6A:
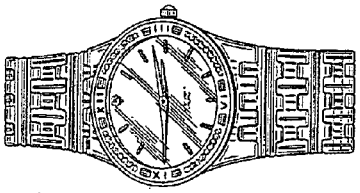
FIG. 6A is a graphical representation of a first display that may be used in a system and method for personalizing a watch, in accordance with an exemplary embodiment of the present invention.

FIG. 6A is a graphical representation of a first display 600 that may be used in a system and method for personalizing a watch, in accordance with an exemplary embodiment of the present invention. The display 600 presents the user with a number of watches, one of which may be selected for personalization. In the example of FIG. 6A, the three watches shown are identical—an actual display in commerce would likely picture a plurality of distinct watches.

Figure 6B:
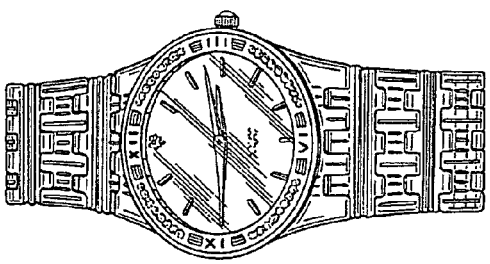
FIG. 6B is a graphical representation of a second display that may be used in a system and method for personalizing a watch, in accordance with an exemplary embodiment of the present invention.

FIG. 6B is a graphical representation of a second display 602 that may be used in a system and method for personalizing a watch, in accordance with an exemplary embodiment of the present invention. The display 602 includes a portion 604 showing customization and/or personalization options. For example, the user may select a metal customization parameter corresponding to 10K gold (checkbox 606(a)) or stainless steel (checkbox 606(b)). Similar to the ring and necklace examples, the display 602 also shows a sample watch model, a price field 610, and a "Continue" button 608. In alternative embodiments, more or less information may be displayed on the display 602.

Figure 6C:
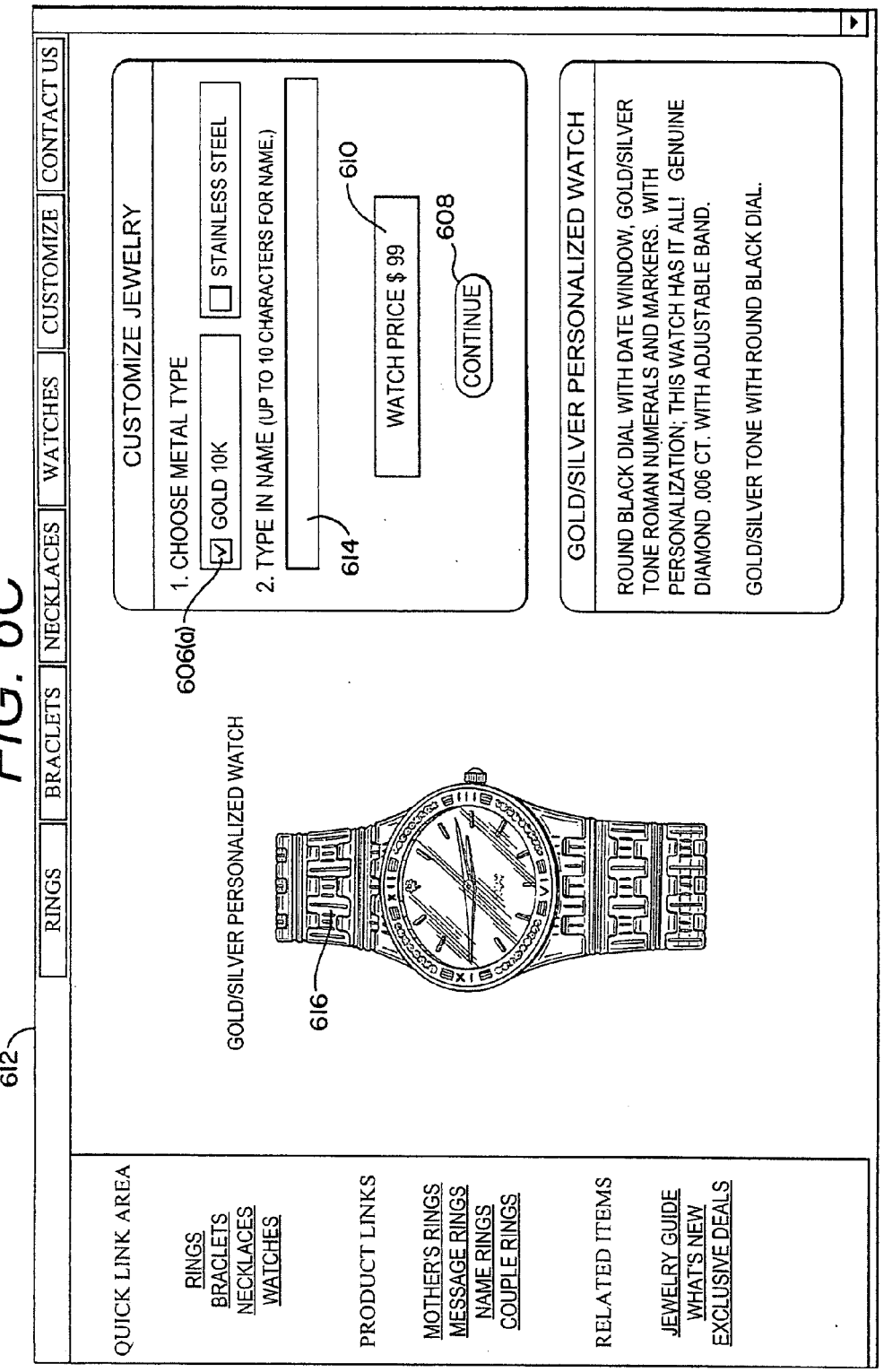
FIG. 6C is a graphical representation of a third display that may be used in a system and method for personalizing a watch, in accordance with an exemplary embodiment of the present invention.

FIG. 6C is a graphical representation of a third display 612 that may be used in a system and method for personalizing a watch, in accordance with an exemplary embodiment of the present invention. The display 612 shows that the user has selected 10K gold by checking the checkbox 606(a). A text field 614 is displayed to allow the user to personalize the watch. In this case, the user is asked to enter a name. Other personalization schemes may alternatively be used, such as logos, pictures, or others. The input means may be adjusted accordingly to receive non-textual input. For example, the user may be able to specify a file to be uploaded for personalization. As personalization proceeds, the price field 610 is updated to reflect the user's personalization and/or customization selections. Similarly, the model 616 is also updated as personalization and/or customization selections are made.

FIG. 6D is a graphical representation of a fourth display 618 that may be used in a system and method for personalizing a watch, in accordance with an exemplary embodiment of the present invention. The display 618 shows that the user has entered the name "Thomas" into the text-entry field 614. In response, a modified model 620 is displayed that shows the watch as altered by the user's personalization and/or customization selections. If any price changes result from the personalization, they may be displayed in the "watch price" field 610. To move further through the personalization process, the user may activate the "Continue" button 608.

Figure 6E:
FIG. 6E is a graphical representation of a fifth display that may be used in a system and method for personalizing a watch, in accordance with an exemplary embodiment of the present invention.

FIG. 6E is a graphical representation of a fifth display 622 that may be used in a system and method for personalizing a watch, in accordance with an exemplary embodiment of the present invention. The display 622 includes a summary portion 624 showing the selected customization and/or personalization attributes, along with the final watch price. A "Go Back" button 626 enables the user to adjust one or more customization and/or personalization attributes, while a "Purchase" button 628 initiates a purchasing sequence.

FIG. 7 is a flow diagram illustrating a method 70 for personalizing a watch, in accordance with an exemplary embodiment of the present invention. The method 70 includes accepting from a user an article to be personalized, as shown in block 700. In this example, the selected article is a personalizable watch. In block 702, a model of the watch is displayed, along with one or more customization and/or personalization options. In block 704, a metal customization parameter is accepted from the user. In block 706, the model's appearance is modified to correspond to the accepted metal customization parameter. In block 708, a design personalization parameter is accepted. In this example, the design personalization parameter may take the form of a user's name, a logo, or some other user-specific characterization. In block 710, the model is modified according to the accepted design personalization parameter. This enables the user to view a realistic sample of the personalized and/or customized watch, which may lead to an informed purchasing decision. In block 712, a summary of customization and/or personalization attributes is presented, along with a model representing the watch as modified by those attributes. Purchasing and pricing information is also likely to be displayed. The method 70 is merely exemplary, and more or fewer steps may be included, and the described steps may be performed in a sequence other than that set forth in FIG. 7.

FIG. 8 is a simplified block diagram illustrating a system 800 for personalizing an article, in accordance with an exemplary embodiment of the present invention. The system 800 includes a prospective buyer terminal 802 connected via a data network 804 to a server 806. The terminal 802 may be a personal computer or other network access device, for example. The data network may be a public internet, a local area network, or some other connection (including a direct hardwired or wireless connection to the server 806. The server 806 may be a personal computer, database server, or some other computing device, located at a remote location from the terminal 802 or at the same facility as the terminal 802. The server 806 is also likely to have a memory and/or other data storage mechanism to store information on personalizable articles, as well as the personalization and/or customization attributes corresponding to those articles. Furthermore, the server 806 includes software instructions operable to execute one or more methods similar to methods 10, 30, 50, and/or 70. The server 806 should possess sufficient processing capabilities to display and modify models as a user situated at the terminal 802 makes personalization and/or customization inputs. Such modeling may be accomplished by accessing a database full of fonts, designs, and/or other graphical alterations. Alternatively, ray-tracing or other graphical manipulation may be initiated based on the particular inputs made by the user at the terminal 802. The result is a user-friendly system in which a prospective buyer may make an informed purchasing decision by viewing real-time or near-real-time models of an article as the prospective buyer makes customization and/or personalization changes.

In view of the wide variety of embodiments to which the principles of the invention can be applied, it should be understood that the illustrated embodiments are exemplary only, and should not be taken as limiting the scope of the present invention. For example, more or fewer elements or components may be used in the block diagrams. In addition, the present invention can be practiced with hardware or a combination of software and hardware.

We claim:

1. A method of personalizing an ornamental ring in real-time via a client-server based system, comprising in combination:

displaying a plurality of ring styles and a ring-price field;

accepting from a user a selection of one of the plurality of ring styles;

displaying a ring model and the ring-price field, one or both of which have been modified in real-time to reflect the accepted selection of one of the plurality of ring styles;

displaying a plurality of ring materials;

accepting from the user a selection of one of the plurality of ring materials;

displaying the ring model and the ring-price field, one or both of which have been modified in real-time to reflect the accepted selections of one of the plurality of ring styles and ring materials;

displaying a plurality of ring sizes;

accepting from the user a selection of one of the plurality of ring sizes;

displaying the ring model and the ring-price field, one or both of which have been modified in real-time to reflect the accepted selections of one of the plurality of ring styles, ring materials, and ring sizes;

displaying a plurality of number-of-birthstones-and-engravings options;

accepting from the user a selection of one of the plurality of number-of-birthstones-and-engravings options;

displaying, in response to accepting the selection of one of the plurality of number-of-birthstones-and-engravings options, a number of birthstone attribute inputs and a number of engraving attribute inputs corresponding to the selected one of the plurality of number-of-birthstones-and-engravings options;

displaying the ring model and the ring-price field, one or both of which have been modified in real-time to reflect the accepted selections of one of the plurality of ring styles, ring materials, ring sizes, and number-of-birthstones-and-engravings options;

displaying a birthstone chart;

accepting from the user a number of birthstone attributes and the same number of engraving attributes, the number corresponding to the accepted one of the plurality of number-of-birthstones-and-engravings options;

displaying the ring model and the ring-price field, one or both of which have been modified in real-time to reflect the accepted selections of one of the plurality of ring styles, ring materials, ring sizes, and number-of-birthstones-and-engravings options, as well as the accepted birthstone attributes and engraving attributes; and displaying an order summary, Which presents the user with at least the options of changing and purchasing the personalized ornamental ring, wherein the order summary reflects the accepted selection of one of the plurality of ring styles, ring materials, ring sizes, and number-of-birthstones-and-engravings options, as well as the accepted birthstone attributes and engraving attributes.

\* \* \* \* \*